US008595156B2

(12) United States Patent
Bovey et al.

(10) Patent No.: US 8,595,156 B2
(45) Date of Patent: Nov. 26, 2013

(54) ASSISTING WITH UPDATING A MODEL FOR DIAGNOSING FAILURES IN A SYSTEM

(75) Inventors: Richard Lee Bovey, Bristol (GB); Erdem Turker Senalp, Bristol (GB)

(73) Assignee: BAE Systems PLC, London (GB)

( * ) Notice: Subject to any disclaimer, the term of this patent is extended or adjusted under 35 U.S.C. 154(b) by 278 days.

(21) Appl. No.: 13/122,319

(22) PCT Filed: Sep. 30, 2009

(86) PCT No.: PCT/GB2009/051277
§ 371 (c)(1),
(2), (4) Date: May 13, 2011

(87) PCT Pub. No.: WO2010/038063
PCT Pub. Date: Apr. 8, 2010

(65) Prior Publication Data
US 2011/0208680 A1    Aug. 25, 2011

(30) Foreign Application Priority Data

Oct. 3, 2008   (EP) ..................................... 08275061
Oct. 3, 2008   (GB) ................................... 0818113.3

(51) Int. Cl.
*G06F 15/18*   (2006.01)
(52) U.S. Cl.
USPC .......................................................... 706/12
(58) Field of Classification Search
None
See application file for complete search history.

(56) References Cited

U.S. PATENT DOCUMENTS

| 6,456,622 | B1 | 9/2002 | Skaanning et al. |
| 6,954,678 | B1 | 10/2005 | Phan et al. |
| 2005/0049988 | A1* | 3/2005 | Dahlquist et al. ............... 706/46 |
| 2005/0160324 | A1 | 7/2005 | Przytula et al. |
| 2008/0235172 | A1 | 9/2008 | Rosenstein et al. |

OTHER PUBLICATIONS

Roure et al. "Incremental Methods for Bayesian Network Learning", 1999, pp. 45, http://citeseer.ist.psu.edu/roure99incremental.html.*
Mechanical Analysis Data Set, 2009, http://archive.ics.uci.edu/ml/datasets/Mechanical+Analysis, pp. 2.*
Greiner et al. "Structural Extension to Logistic Regression: Discriminative Parameter Learning of Belief Net Classifiers", AAAI, 2002, pp. 167-173.*
International Search Report (PCT/ISA/210) for PCT/GB2009/051277 dated Jul. 16, 2010.
Written Opinion (PCT/ISA/237) for PCT/GB2009/051277 dated Jul. 16, 2010.

(Continued)

*Primary Examiner* — Li-Wu Chang
(74) *Attorney, Agent, or Firm* — Buchanan Ingersoll & Rooney PC

(57) ABSTRACT

The method includes obtaining system model data representing a set of failures in a system including a plurality of components, a set of symptoms and relationships between at least some of the failures and symptoms. The system model data is used to create a Bayesian Network. Failure cases data is also obtained, where each failure case describes the presence/absence of at least one of the symptoms and the presence/absence of at least one of the failures. A learning operation on the Bayesian Network using the failure cases data is then performed and the contribution made by at least some of the failure cases to updating the parameters of the Bayesian Network during the learning operation is assessed. Information representing the assessed contribution of the at least some failure cases is displayed.

14 Claims, 11 Drawing Sheets

(56) References Cited

OTHER PUBLICATIONS

European Search Report for EP 08275061 dated Jul. 6, 2009.
"Genie 2", On-line Documentation, Dec. 20, 2007, retrieved from the Internet: URL: http://web.archive.org/web/20071213221803/genie.sis.pitt.edu/online_docs.html.
N. Jongsawat et al., "Dynamic Data Feed to Bayesian Network Model and SMILE Web application", IEEE Computer Society: Ninth ACIS International Conference on Software Engineering, Artificial Intelligence, Networking, and Parallel/Distributed Computing 2008, Aug. 8, 2008, pp. 931-936.
R. Greiner et al., "Structural Extension to Logistic Regression: Discriminative Parameter Learning of Belief Net Classifiers", Machine Learning, Jun. 1, 2005, pp. 397-322, vol. 59, No. 3.
United Kingdom Search Report for GB 0818113.3 dated Jan. 21, 2009.

* cited by examiner

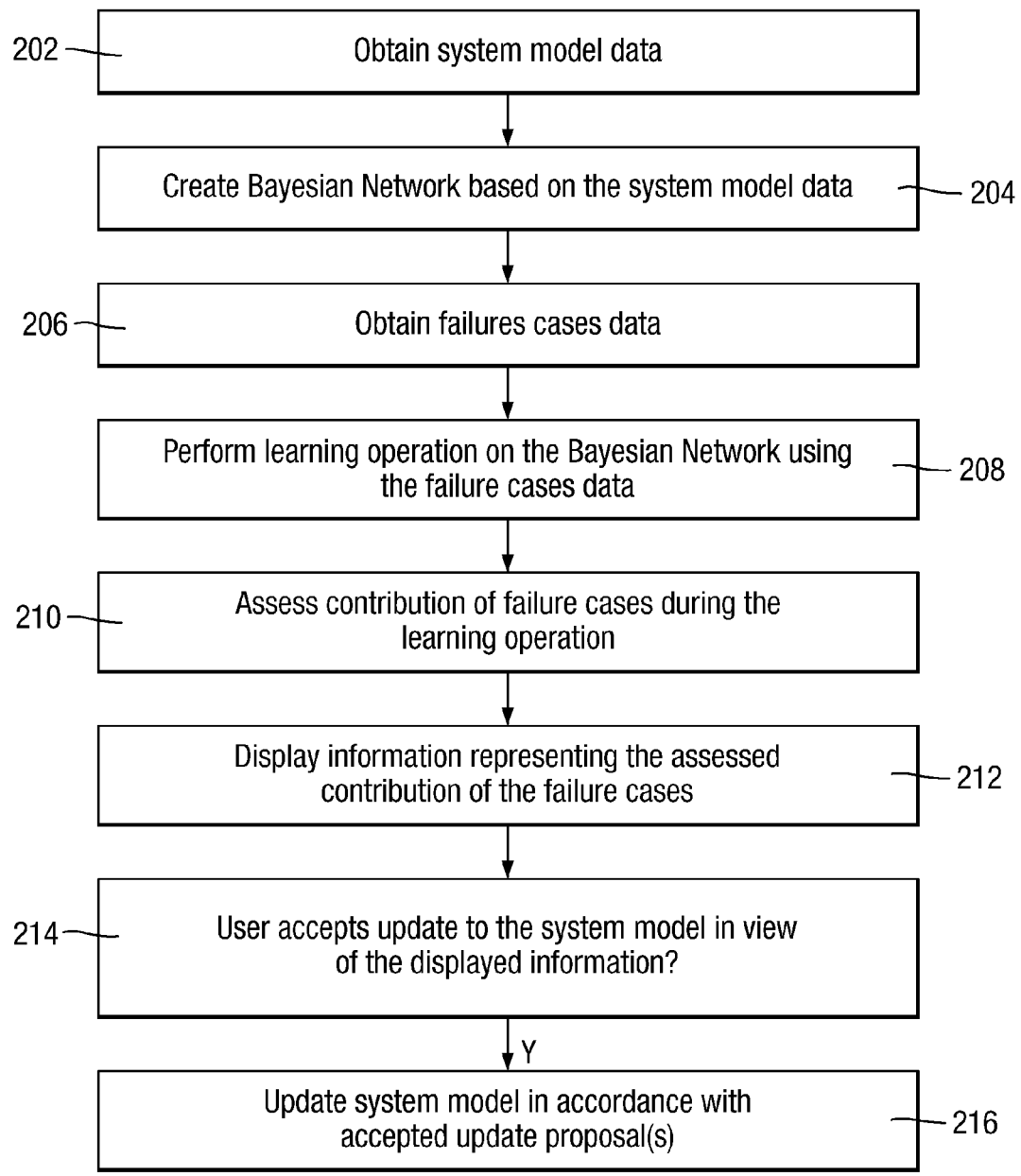

Failure Label "O" stands for Other related failures if present

Suggested Layout Details for Reason ID:(1,0)

ASSISTING WITH UPDATING A MODEL FOR DIAGNOSING FAILURES IN A SYSTEM

The present invention relates to assisting with updating a model for diagnosing failures in a system.

Failure mode and effects analysis is a technique that is used to create a failure-symptom model that can be used to identify the most likely failures in a system using data about the known symptoms and their relationships to known failures. Diagnostic applications can then use the model to identify the likely failure given information about the symptoms. The construction of a model defining relationships between failures and associated symptoms is normally built using expert knowledge initially and can then be refined as further information regarding the relationship between failures and symptoms becomes available, typically by receiving failure case data collected during use of the system in practice.

Models of real systems can be large, with hundreds of symptoms and failures are related to one another by probabilistic links. Improving such models can involve verifying that the link structure is correct (i.e. a failure does truly cause the linked symptoms); calculating the true prior probabilities of failures occurring and/or calculating the conditional probabilities of the symptoms' relationship with failures. It is known to use learning processes with probabilistic Bayesian Networks describing the model to improve a system model. However, the results of the learning processes can be subtle and can take place over a considerable period of time. Therefore, an expert reviewing the system model may not be aware of, or fully understand, why or how the model has been updated by the learning process.

Embodiments of the present application are intended to address at least some of the problems discussed above. Embodiments provide information that can alert a user (typically a subject matter expert who is reviewing the system model) to possible changes to the model and can also provide an explanation of the logic and reasoning behind the proposed changes. The user can then decide to accept or reject the proposed changes based on his expert opinion.

According to one aspect of the present invention there is provided a method of assisting with updating a model for diagnosing failures in a system, the method including:

obtaining system model data representing a set of failures in a system including a plurality of components, a set of symptoms and relationships between at least some of the failures and symptoms;

creating a Bayesian Network having parameters based on the obtained system model data, the Bayesian Network describing probabilistic relationships between at least some of the failures and at least some of the symptoms;

obtaining failure cases data representing a plurality of failure cases, each said failure case describing presence/absence of at least one of the symptoms and presence/absence of at least one of the failures;

performing a learning operation on the Bayesian Network using the failure cases data;

assessing a contribution made by at least some of the failure cases to updating the parameters of the Bayesian Network during the learning operation, and displaying information representing the assessed contribution of the at least some failure cases.

The step of assessing the contribution made by at least some of the failure cases can include calculating a likelihood gradient contribution of the failure cases. The relationships between at least some of the failures and symptoms in the system model data can include failure-symptom conditional probabilities. The gradient contribution may be calculated for each of the at least some failure cases ($C_i$) for each of the Bayesian Network parameters ($P_j$) and for each optimisation epoch ($E_k$) of the learning operation.

The Bayesian Network may comprise a Binary Node Two-layer Noisy-Or Bayesian Network. The learning operation may involve a maximal likelihood learning operation.

The method may further include receiving input representing a selection of one of the updated parameters and the displayed information may include at least one said failure case associated with the selected parameter, the at least one displayed failure case being selected according to its assessed contribution to the updating of the selected parameter. Thus, the at least one displayed failure case can represent a "justification" for updating data corresponding to the selected parameter in the system model.

The method may further include receiving input indicating acceptance or rejection of the updated selected parameter, and if the input indicates acceptance, updating data corresponding to the updated selected parameter in the system model data. The system model data may be updated with a new value for a conditional probability between a said failure and a said symptom as calculated by the learning operation. The system model data may be updated with a new value for a failure prior probability or a symptom-leak probability as calculated by the learning operation.

The method may include a step of displaying a proposal for increasing/decreasing a conditional probability between a said failure and a said symptom as computed by the learning operation. The method may include a step of displaying a proposal for removing/adding a conditional probability relationship/link between a said failure and a said symptom based on an updated conditional probability value computed by the learning operation.

The calculation of the likelihood gradient contribution can include computing a three-dimensional gradient analysis object. The calculation of the likelihood gradient contribution can further include:

using the three-dimensional gradient analysis object to generate a two-dimensional gradient analysis table (e.g. by summing), sorting a column of the generated table including a parameter of interest (e.g. one selected by a user) according to the gradient contribution of the failure cases in that column, selecting at least one failure case in the sorted column having a highest said gradient contribution(s), and normalising the at least one selected failure case.

According to another aspect of the present invention there is provided a computer program product comprising computer readable medium, having thereon computer program code means, when the program code is loaded, to make the computer execute a method of assisting with updating a model for diagnosing failures in a system substantially as described herein.

According to a further aspect of the present invention there is provided apparatus adapted to assist with updating a model for diagnosing failures in a system, the apparatus including:

a device adapted to obtain system model data representing a set of failures in a system including a plurality of components, a set of symptoms and relationships between at least some of the failures and symptoms;

a device adapted to use the obtained system model data to create a Bayesian Network describing probabilistic relationships between at least some of the failures and at least some of the symptoms;

a device adapted to obtain failure cases data representing a plurality of failure cases, each said failure case describing presence/absence of at least one of the symptoms and presence/absence of at least one of the failures;

a device adapted to perform a learning operation on the Bayesian Network using the failure cases data;

a device adapted to assess a contribution made by at least some of the failure cases to updating of the Bayesian Network during the learning operation, and a device adapted to display information representing the assessed contribution of the at least some failure cases.

According to yet another aspect of the present invention there is provided a system model updated using/according to the method substantially as described herein. According to a further aspect of the present invention there is provided a method of updating data representing a system model for diagnosing failures in a system including a plurality of components, the method including:

obtaining data representing an initial/current model of the system;

applying the method of assisting with updating the model substantially as described herein, and updating the system model data in view of the information displayed by the update assistance method.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 2 illustrates schematically steps of a process for assisting with updating the system model;

An overview of the stages typically involved in creating a failure/symptom model of a system will now be given. First, a description of the system of interest is created. The second stage can involve identifying states and failure modes of the system components. For example, in a pump tray apparatus the components may comprise a tank and a failure state that can be associated with that valve is "position". The identification of the failure modes may be based on the knowledge of at least one expert. Next, a table (or any other suitable data structure) is created that stores information describing the symptom(s) associated with each failure mode. Again, this will typically be based on expert knowledge. The fourth stage involves generating a failure mode/symptoms matrix containing values representing the probability of a particular symptom causing the failure mode. The next stage is to validate the table and the results of the validation can be used to modify the table. This can involve comparing the table against a test rig or in-service data that provides a list of failures and their associated symptoms. Unit tests may be created (e.g. using a tool such as Matlab™ by The MathWorks of Natick, Mass., USA) and utilised to check that the diagnostic tool identifies the correct failure when the symptoms are added to the tool. When a large model is being processed then a set number of failures may be selected to validate the table, but all the failures may be tested with a smaller model.

Figure 1:
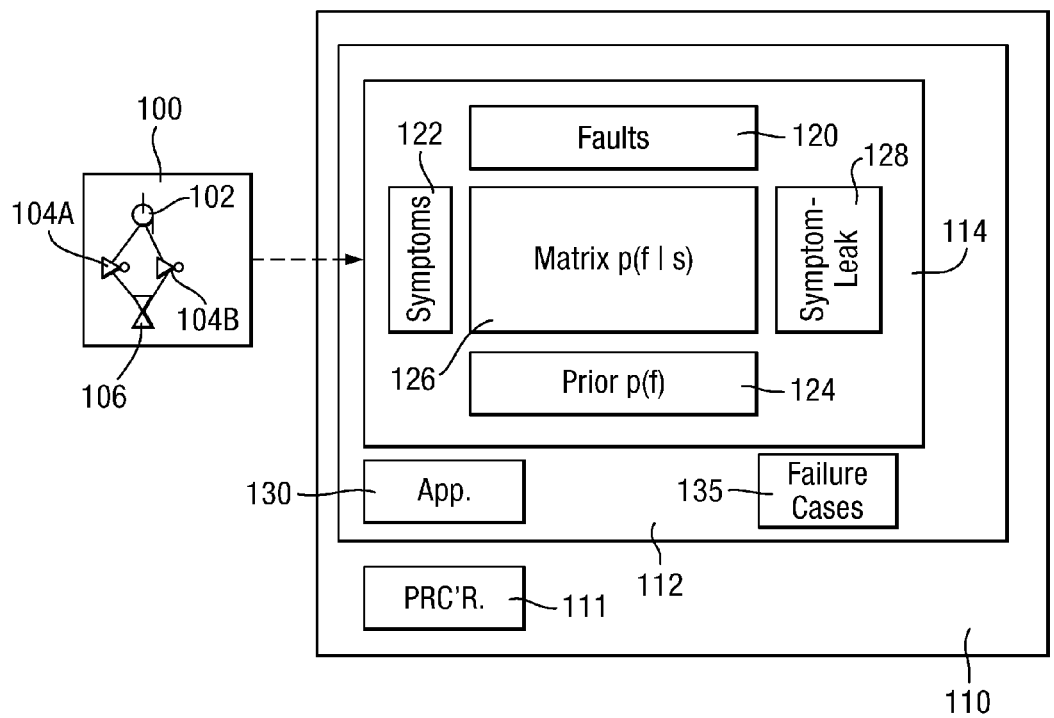
FIG. 1 is a schematic illustration of a system model and a computer configured to store data representing the system model.

As mentioned above, an early stage in the model creation process involves creating a description of the system. FIG. 1 shows a schematic representation 100 of a system. The example system is a pump tray that comprises various different types of components, such as a pump 102, sensors 104A, 104B and a valve 106. It will be understood that the arrangement is exemplary only and the embodiment described herein can be used to assist with updating a model of any system comprising a plurality of components (which may be arranged into subsystems) in which it is desired to diagnose failures.

FIG. 1 also shows a computing device 110 having a processor 111 and a memory 112 that is configured to store data 114 representing the model of the system. The system model data 114 is shown as being arranged into five divisions/parameters, although it will be appreciated that this is exemplary only and also the system model data can be stored in any suitable format/structure. The system model data in the example includes a set of failures 120, e.g. "valve 106 stuck". The system model data further includes a set of symptoms 122, e.g. "pump 102's warning light on". The system model data also includes data relating to relationships between at least some of the failures and at least some of the symptoms. In the example the failure-symptom relationship data includes a set of prior probabilities 124, which represent the probability that the failure is present without observing any symptoms and this can be used to model the reliability of a component. The failure-symptom relationship data further includes a matrix/table of failure-symptom probabilities 126. Such a matrix will be familiar to the skilled person and, briefly, stores information representing the probability of observing one of the symptoms as present given the presence of only one failure. The failure-symptom relationship data further includes symptom-leak probability 128 for each of the symptoms, which represents the probability that the symptom is observed as present in the absence of all modelled failures. A table showing a simple example of the system model data is given below:

| | Symptom-leak probability | Failure 1, e.g. valve stuck | Failure 2, e.g. pump leaking |
|---|---|---|---|
| Prior | — | 0.1 | 0.2 |
| Symptom 1, e.g. warning light on | 0.9 | 0.0 | 0.6 |
| Symptom 2, e.g. water leaking from pump | 0.8 | 0.4 | 0.0 |

The memory 112 of the computer 110 also includes code for an application 130 that is intended to assist with updating the system model data. FIG. 2 illustrates steps performed by the application 130. It will be appreciated that the steps shown are exemplary only and in some cases the order of the steps could be changed and/or some of the steps could be omitted and/or further steps could be included. At step 202 data describing a system model is obtained. This data will typically be data that has already been updated by the application 130, but may initially be created based upon expert knowledge alone. The format, structure, and so on of the system model data can take any suitable form, e.g. a tree, table, etc.

At step 204 a Bayesian Network (a directed graphical model) is created based on the system model data. The skilled person will be familiar with such representations and operations, and reference is made to publicly-available software, such as SMILE and GeNie, produced by Decision Systems Laboratory, University of Pittsburgh, USA, that can be used to create Bayesian Network-based model data and perform/implement diagnostic operations upon them. The system model data provides the parameters of the Bayesian Network, including probabilities. In one embodiment the Network is a BN2NO (Binary Node Two-layer Noisy-Or Bayesian Network) form of Bayesian Network because this is particularly good for scalability. However, it will be understood that other forms could also be used. For instance, the system model could be used as the parameters for a single failure Bayesian network, where there is only one parent node.

Figure 3:
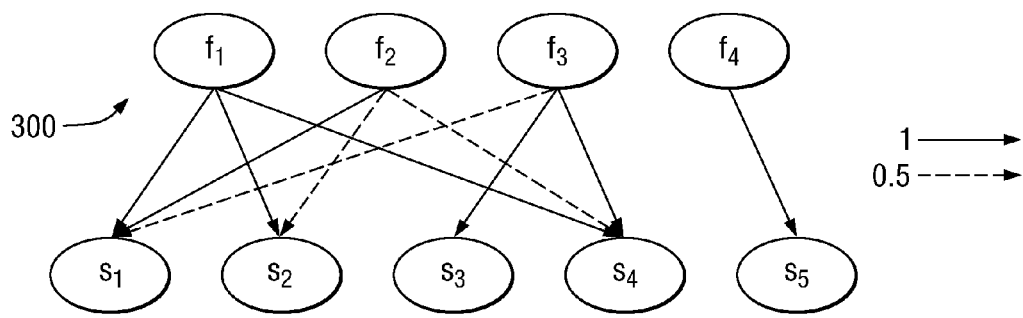
FIG. 3 illustrates schematically a Bayesian Network used by the update assistance process.

FIG. 3 is an illustration of an example Bayesian Network 300 constructed using a system model built directly from expert knowledge. The expert knowledge may only contain a coarse measure of the symptom-failure links and so the link weights (or conditional probabilities) are extremely simple in the example. These conditional probabilities are an approximation to ground truth, which could be refined throughout the life of the system by learning from the actual failure cases. In the example Network the conditional probabilities are 1 for strongly expected symptoms and 0.5 for those which might occur sometimes in the presence of a certain failure. $s_2$, for example, occurs with probability 1 if $f_1$ is present and with only probability 0.5 if $f_2$ is present. Without doing any complex calculations one can infer that if $s_2$ is the only evidence then the system would suspect $f_1$ as the cause with twice the probability of $f_2$.

At step 206 failure cases data (illustrated schematically as 135 in FIG. 1) is obtained. This data is usually built using observations of failures/symptoms that have been made during use of the system being modelled since the model was created/last updated. Typically, the symptoms are observed on first inspection and then a suspect component is removed. The component is then tested, e.g. on a bench, and this test results in confirmation or denial of the suspected failure. In general the application 130 can deal with any reasonable number of failure/symptom observations. Thus, the failure cases are records of how the system failed in service, as noted by maintenance personnel, for example. The intention is that the data on failure cases can be used improve the system model using a learning operation so that the model more closely fits the set of observed failure cases, as will be described below.

Each failure case described by the data can include an indication of which symptom(s) was/were observed (or not observed) and which failures(s) was/were confirmed as being present (or absent). Observed symptoms can either be present symptoms or absent symptoms. Similarly, observed failures can either be present failures or absent failures. Absent failures can correspond to the failures that had been thought to be present before detailed investigations were carried out, and which were subsequently found to be absent. For example, a suspected component is removed from the system and a serviceability test finds that the component is serviceable. An example set of two failure cases is shown in the table below, although it will understood that variations are possible (e.g. only observed failures/symptoms may be recorded):

| Failure case number | Present Failures | Absent Failures | Present Symptoms | Absent Symptoms |
|---|---|---|---|---|
| 1 | Pump 1 Blockage | | Low pressure | Warning light on |
| 2 | | Level switch stuck low | Warning light on | |

At step 208 a learning operation is performed on the Bayesian Network using the failure cases data. The learning operation results in updating of the parameters of the Network and these updated parameters can be used as the basis for suggested changes to the system model. It will be understood that this operation can be performed in various ways and not all of the failure cases in the data obtained may be processed together at the same time. Given a set of failure cases an inference algorithm (e.g. Quickscore for the BN2NO form of Bayesian Network, although the skilled person will be familiar with alternatives) can be used to compute the probability of observing the failure cases according to the system model. This probability is called the likelihood and can be thought of as a function of the parameters of the system model. By varying the parameters of the model (e.g. the conditional probability of a symptom given one failure) it is possible to increase the likelihood of the observed failure cases. Thus, the learning operation will normally modify the conditional probability values of links between symptoms and failures, prior probabilities and symptom-leak probabilities in the Bayesian network and result in the Network more closely corresponding to the actual performance of the system. In the example described herein a maximal likelihood learning operation is applied, but it will be understood that other learning techniques can be used. For instance, a term can be added to the objective function of the learning operation that is aimed to penalise large model changes.

At step 210 the contribution of at least some of the failure cases processed during the learning operation is assessed. The application 130 is intended to provide information that can be used as at least one suggested update to the system model based on computations performed during the learning process and the information can also give an indication of the reasons/justification for the suggestion(s). The failure cases are ranked according to the sum (over epochs of the learning operation) of the likelihood gradient element for the parameters, and this is referred to as the ranking value. The failure case(s) with the highest-ranking value(s) is/are selected as the reasons for making that update proposal. As users of the application may be concerned with the relative importance of each failure case, a percentage "impact" of each reason/case may also be provided. The ranking values are used to compute the impact percentages by normalising the ranking values by the largest-ranking value for the suggested update/system model parameter.

Figure 4:
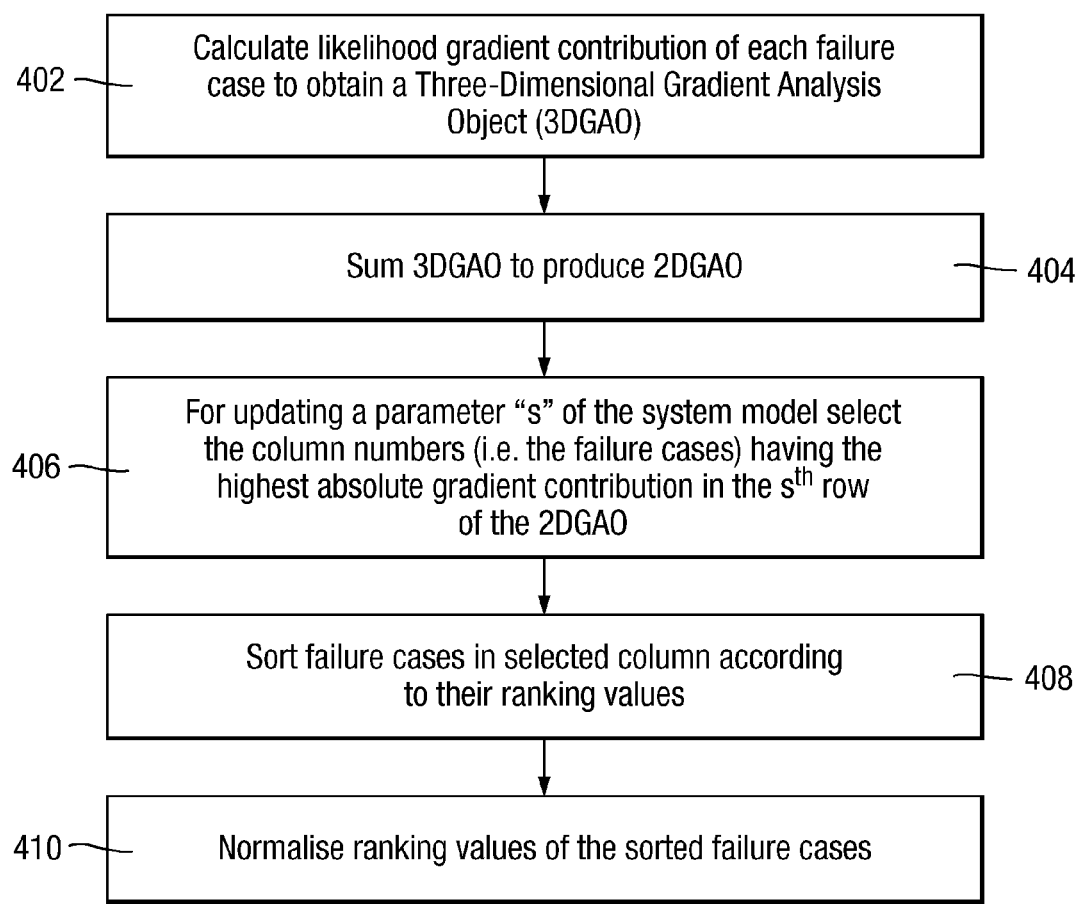
FIG. 4 illustrates schematically steps of an assessment procedure performed by the update assistance process.

An example of an algorithm used to compute the ranking values is illustrated schematically in FIG. 4, although variations to the steps shown in that diagram will be apparent to the skilled person. The example includes calculating a likelihood gradient contribution for the failures cases involved in the learning process. Likelihood is the probability of observing a particular set of evidence, for example, a failure case or set of failure cases. Each failure case is assumed to be independently drawn from an identical distribution. Given this assumption the log likelihood is given by the sum of the log likelihood for each failure case. Each term in this sum is the contribution to the likelihood due to each failure case. The gradient (first differential, or rate of change) of the likelihood with respect to a parameter is also a sum with a term for each failure case. Each term in the gradient sum is the "likelihood gradient contribution" for a particular failure case. At step 402 the likelihood gradient contribution of each failure case, for each of the model parameters and for each optimisation epoch during the learning operation is computed and stored in order to obtain a Three-Dimensional Gradient Analysis Object (3DGAO) shown by Equation (1) below:

$$3DGAO = \left\{ \begin{bmatrix} g_{11k} \\ g_{21k} \\ \vdots \\ g_{m1k} \end{bmatrix} \begin{bmatrix} g_{12k} \\ g_{22k} \\ \vdots \\ g_{m2k} \end{bmatrix} \begin{bmatrix} g_{13k} \\ g_{23k} \\ \vdots \\ g_{m3k} \end{bmatrix} \cdots \begin{bmatrix} g_{1nk} \\ g_{2nk} \\ \vdots \\ g_{mnk} \end{bmatrix} \right\}_{k=1,\ldots,e} \quad (1)$$

where:
 m is the total number of parameters in the system model, including the priors, conditionals and leak node probabilities;
 n is the total number of failure cases in the failure cases data being processed, and
 e is the total number of optimisation epochs during the learning operation (i.e. Gradient contribution $g_{ijk}$ for the parameter $P_j$, failure case $C_i$, and epoch $E_k$)

At step 404, which can be performed by the application 130 after the learning operation has been completed, the dimension of the 3DGAO is reduced to 2D by summing. A 2DGAO (shown by Equation (2) below) comprises likelihood gradient contributions over all the optimisation epochs in order to obtain ranking values.

$$2DGAO = \left\{ \begin{bmatrix} G_{11} \\ G_{21} \\ \vdots \\ G_{m1} \end{bmatrix} \begin{bmatrix} G_{12} \\ G_{22} \\ \vdots \\ G_{m2} \end{bmatrix} \begin{bmatrix} G_{13} \\ G_{23} \\ \vdots \\ G_{m3} \end{bmatrix} \cdots \begin{bmatrix} G_{1n} \\ G_{2n} \\ \vdots \\ G_{mn} \end{bmatrix} \right\} \quad (2)$$

(i.e. Gradient contribution $G_{ij}$ for the parameter $P_j$, and failure case $C_i$)

The sum of the gradient may not be a true measure of the change of the parameters due to the failure case but is a reasonably accurate metric. Alternatives to the gradient contribution technique can be used. The gradient contribution is one relative metric to measure the influence of a failure case on the change of a parameter due to optimisation. In the known gradient descent optimisation technique (where the step size is 1), the step at each stage is simply the gradient vector. For this objective function the total step at each stage for gradient descent is the sum of the step due to each failure case. Therefore, by summing the steps due to a failure case over all steps of the optimisation it is possible to obtain the change of the parameters due to the failure case.

At step 406 in a decision-making phase, given a user selected suggestion on updating a parameter "s" of the system model, the column numbers (i.e. the failure cases) having the highest absolute gradient contribution (i.e. high impact) in the $s^{th}$ row of the 2DGAO is selected. It will be understood that the application 130 can be configurable to select one or more highest-impact failure cases. At step 408 the failure cases in the selected column are sorted according to their ranking values/Gradient contribution $G_{ij}$ and at step 410 these ranking values are normalised in order to obtain the impact factors.

Returning to the overview of FIG. 2, at step 212 information representing the assessed contribution of the at least some failure cases is displayed. As will be discussed below, the way in which the information is displayed can be varied. The intention is that the displayed information will assist a user determine how the system model should be updated. For instance, failure case(s) computed to have the high impact factor(s)/contribution can be highlighted and presented as the most probable reason(s) for a suggestion on updating the system model parameter(s).

At step 214 a user of the application 130 provides input that represents acceptance or rejection of a system model update. In alternative embodiments, a user can update the system model data independently of the update assistance application 130, with the application displaying the failure cases contribution information for consideration by the user. For each/any proposal that is accepted then at step 216 the corresponding parameter data in the current system model is updated to the suggested value that was obtained by the learning process and the updated model can be set as the new system model. The update of the model data can be performed fully automatically by the application 130, or with some input by the user. Any of the proposals not accepted by the user are not applied to the model data. If conditions change in the future, the updated model can be used as the new initial model and the learning/updating process can be applied again. The system model will typically be used by a diagnostic tool (which may be executed by the computer 110 or another device) to compute the probability of failures in the system given a set of observed symptoms.

The system model parameters can be adjusted in order to avoid worst case scenario during computations in the learning operation. For example, having zero likelihood could create a problem in computing the gradients of the objective function during learning. To avoid mathematical inconsistencies throughout learning such as log(0) or terms having division by zero, the relevant terms in the mathematical expressions can be adjusted throughout the learning application. As an example, current failure-symptom matrix elements that are equal to 1 may be replaced by subtracting a small amount named as eps. Here, eps is equal to $2.2204 \cdot 10^{-16}$. As another example, the leak node values being equal to zero can be replaced by adding the small value eps.

Real failure diagnosis system models and real failure cases have been studied in order to evaluate the application's utility in updating a realistic system model. For a system model having a large number of parameters and for the learning operation, the known Quickscore inference algorithm can be used. A consequence of this is that a large number of computations are required, the number of which increases exponentially with the number of present symptoms and so the learning process may be modified to cope with the larger-sized real data. For instance, the inference can be simplified by using sub-networks based on the currently observed symptoms (ie. a sub-graph with the appropriate subset of parameters) and this concept can be modified and applied to the system models for learning. Depending on the failure cases, the effective system models of instances on learning are reduced one by one and the modified inference is applied on each reduced model. The reduced system model has the symptoms that are observed in the failure case of interest. In addition, all of the failures are taken into account. Thus, in a reduced system model, the number of symptoms is decreased and it is equal to the number of observed symptoms of the original system model in a failure case of interest. Also, successive calls of inference functions for the same parameters are optimised by caching the result values. The overall updating results remained substantially the same but the computation time for learning was decreased and so the learning application can be more efficient for large sized real data and showed a considerable performance increase.

Figure 5:
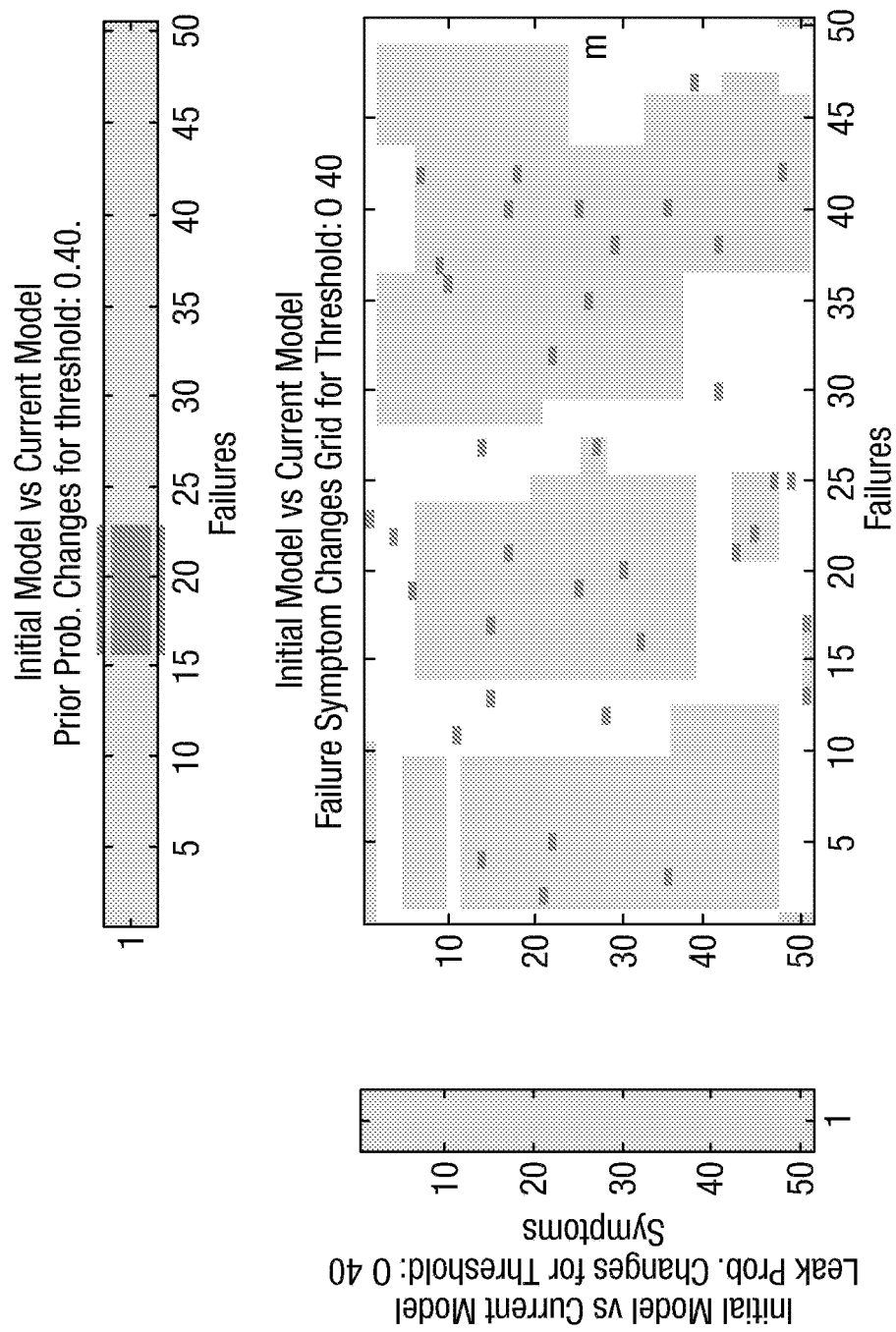
FIGS. 5 to 14 are examples of screen displays that can be generated by the update assistance process.

Examples of how the application 130 can present update proposals to a user for information and for assisting his/her decision as to whether or not the system model should be updated in accordance with the proposals will now be described. A GUI (Graphical User Interface) generated by the application can summarize information for a large system model concerning the failure symptom matrix, leak probability vector and prior probability vector suggestions in a grid structure, but it will be understood that variations to this are possible. FIG. 5 is an example of such a grid-based interface showing update suggestions for a model having 51 symptoms and 50 failures. The potentially highly important suggestions can be highlighted, e.g. displayed in red colour, whilst other suggestions are not highlighted, e.g. displayed in blue. The application 130 may allow the level of importance to be preset/selected, e.g. at 0.4, which indicates that the suggestion/proposal would result in a 40% change in the current model parameter of interest.

Figure 6:
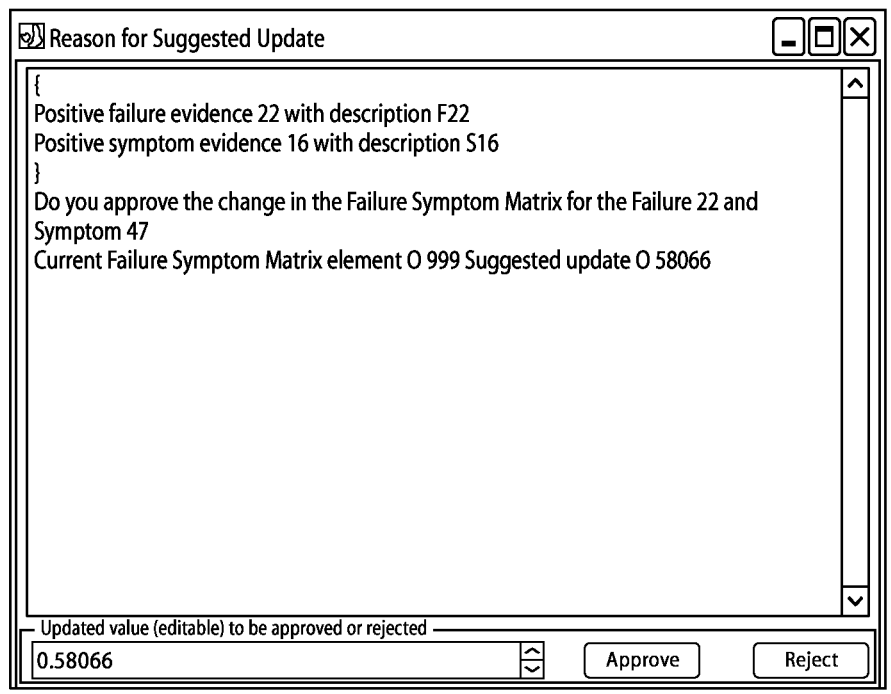

The GUI can be interactive. For instance, selecting the red cells will display the reason for suggesting a change to the current model parameter. An example interface for a "Suggestions" window is shown in FIG. 6. The selected suggested change will reduce the conditional, $fm_{4,\ 22}$, and the given reason (or justification) is a failure case with failure F22 present and symptom S16 present (all other symptoms including S4 are absent). This failure case justifies the suggested change because F22 is present when S4 is absent and so the link (i.e. the value of the conditional probability) between F22 and S4 is reduced.

Figure 7:
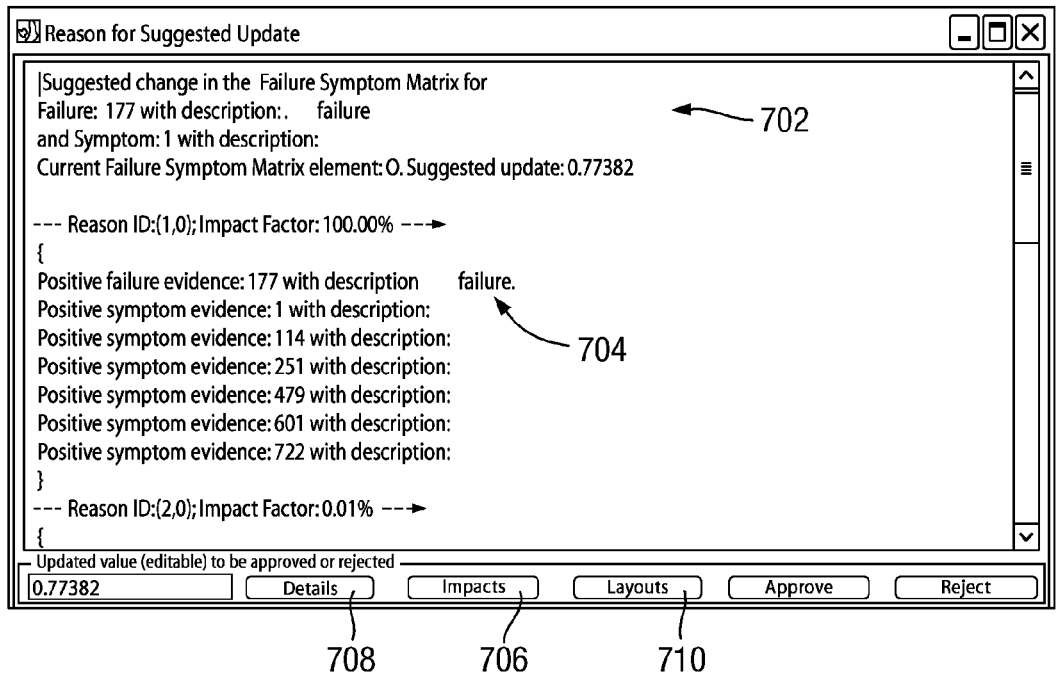

When the initial learning process has terminated the user can invoke the GUI shown in FIG. 7, where suggestions on updating the model parameters are displayed along with their most probable reasons as described above. In general, it is observed that the failure cases and their corresponding effects on the system parameters are coherent. As an example, when a failure-symptom pair is observed in the failure case set and if the current failure symptom matrix element corresponding to that pair is a small value, then the updated current failure symptom matrix element corresponding to that pair after learning is a larger value.

Figure 8:
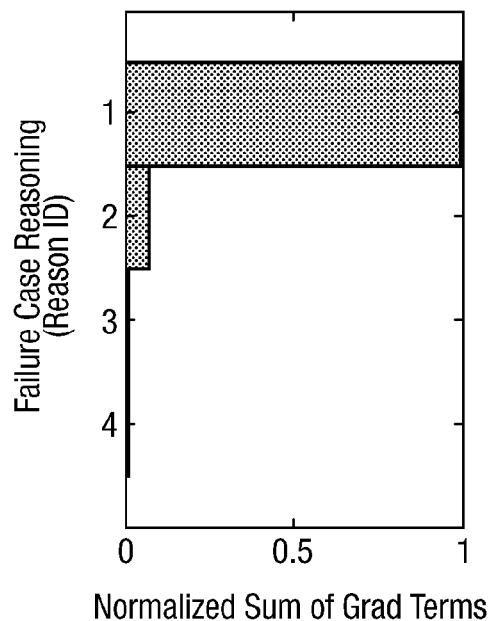

FIG. 7 shows an example interface indicating suggestions for changing the conditional links in the system model. This "Suggestion" interface window displays the updated suggestion 702 and summarizes the most probable reasons 704 for the suggested change with the relevant failure cases and their relative impacts. The impacts can be displayed on a bar chart or any other suitable visual format. For example, when the user selects the "Impacts" button 706 on the "Suggestions" interface, a bar chart such as that shown in FIG. 8 can be displayed that graphically presents the relative impacts of the relevant failure cases on the update suggestion. In the example bar chart, the y-axis corresponds to the Reason ID number and the x-axis corresponds to the normalized sum of gradient terms for each reason as an impact factor on the reasoning.

The "Suggestion" interface window can also give the previous, current and suggested values of the system parameter of interest. In addition, the user can enter a value on the editable updated value panel in order to update the link of interest with a different value. Also, the user can obtain the details of the reasons for the suggestion. The relevant layout sub-graphs are also provided in order to help visualizing the failure case and the suggested update. With the information provided, a user can make the decision on approving or rejecting the update suggestion. The information displayed can include additional data that is not used for updating, for example, from which particular vehicle/aircraft the faulty component was removed; who removed it; who performed the bench test, etc.

Figure 9:
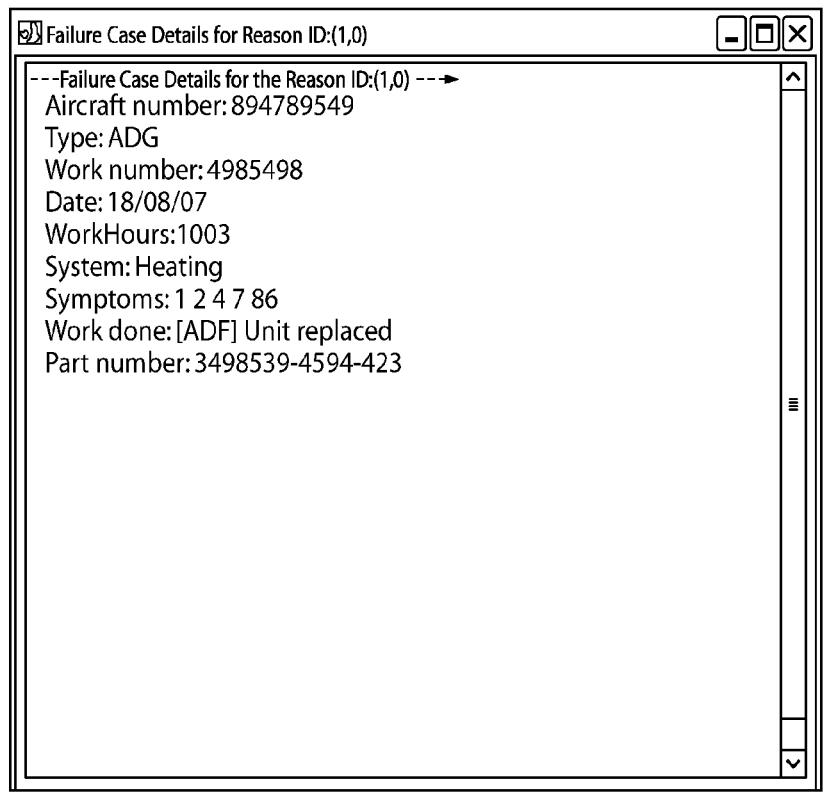

To view details of the failure cases that are the most probable reasons for the suggested update, the user can press the "Details" button 708 on the "Suggestion" interface, which generates the information window shown in FIG. 9.

When the user selects "Layouts" button 710 on the "Suggestions" interface of FIG. 7, the relative layouts of the sub-graphs of the relevant failure cases on the update suggestion is graphically presented as a two-layered noisy-or Bayesian Network sub-graph layout. The layout window is informative as it shows the observed symptoms, the observed failures, and the relating failures. In order to obtain the relating failures Quickscore inference is applied on the current system model with the failure case of interest. The posterior probabilities for the failures are computed and the failures having higher posteriors are taken as the relating failures in the layout of the sub-graph. Thus, the user can see not only the failures in the failure case but also the relating failures. An example of the layouts presented is shown in FIG. 10.

Figure 10:
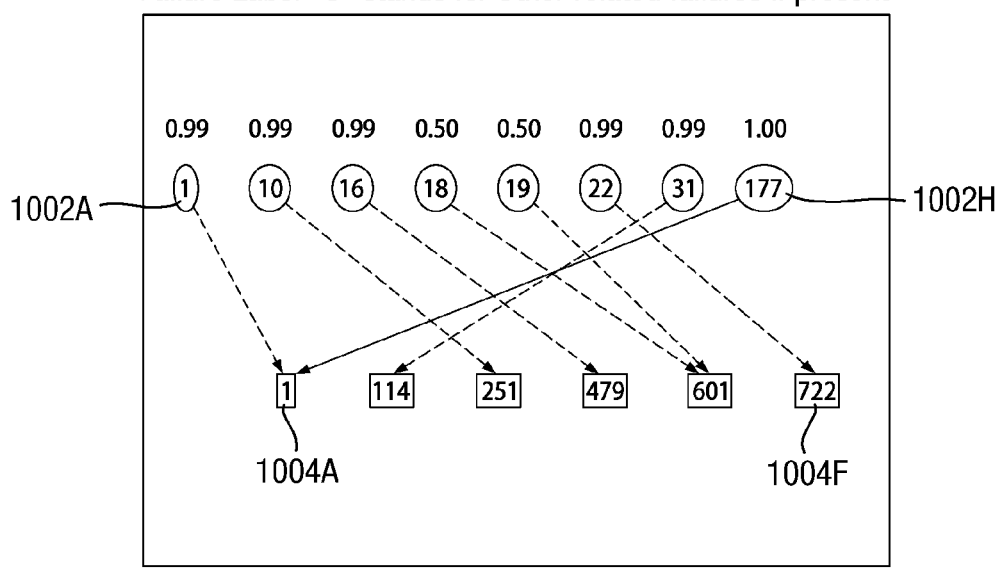

In the layout of FIG. 10, the failures 1002A-1002H are shown with their IDs in circular nodes and the symptoms 1004A-1004F are shown with their IDs in rectangular nodes. Present failure nodes and present symptom nodes are coloured red; absent ones are in coloured blue. The other relevant failure nodes are coloured in black with their corresponding IDs. If there are some other failures related to the symptoms then those are displayed as grouped in one node labelled as "0". All of the failure nodes in the layout have their corresponding initial posterior probabilities displayed above them.

The initial links in between the failures and symptoms in the layout are shown coloured grey. The suggested upwards changes in the link values are shown coloured dark red. The suggested downwards changes in the link values are shown coloured dark blue. The previously approved upwards changes in the link values are shown coloured light red and the previously approved downwards changes in the link values are shown coloured light blue.

Figure 11:
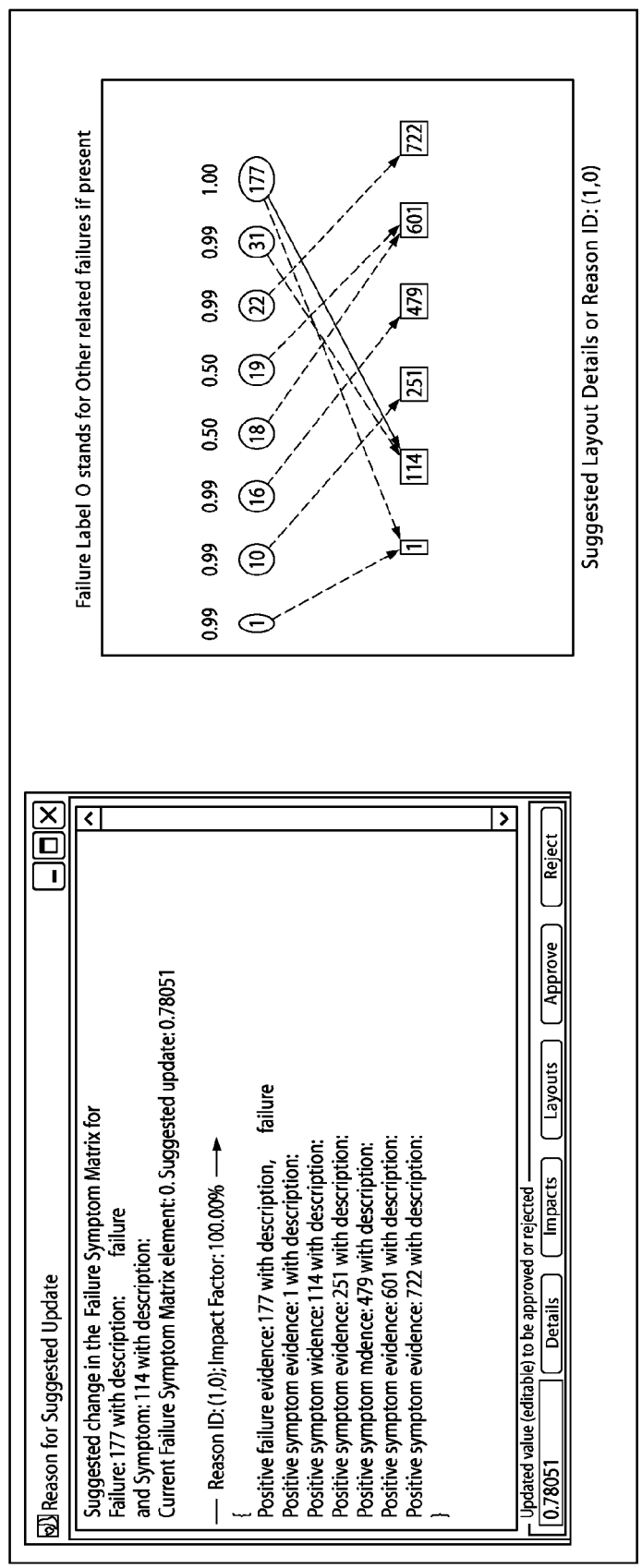
Figure 12:
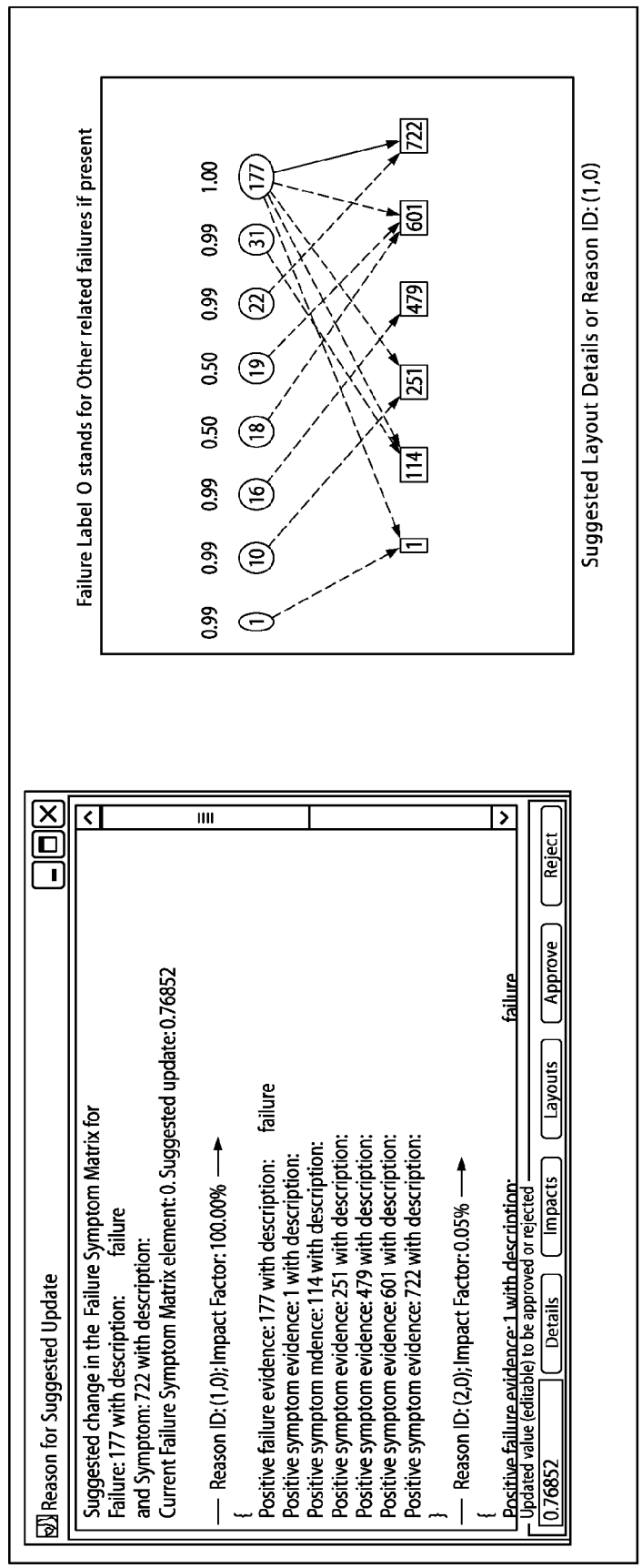

If the user approves this update suggestion then further information is presented by means of a display such as that shown in FIG. 11. If the user approves the update suggestion and successive update suggestions as well then further information is presented by means of a display such as that shown in FIG. 12.

Figure 13:
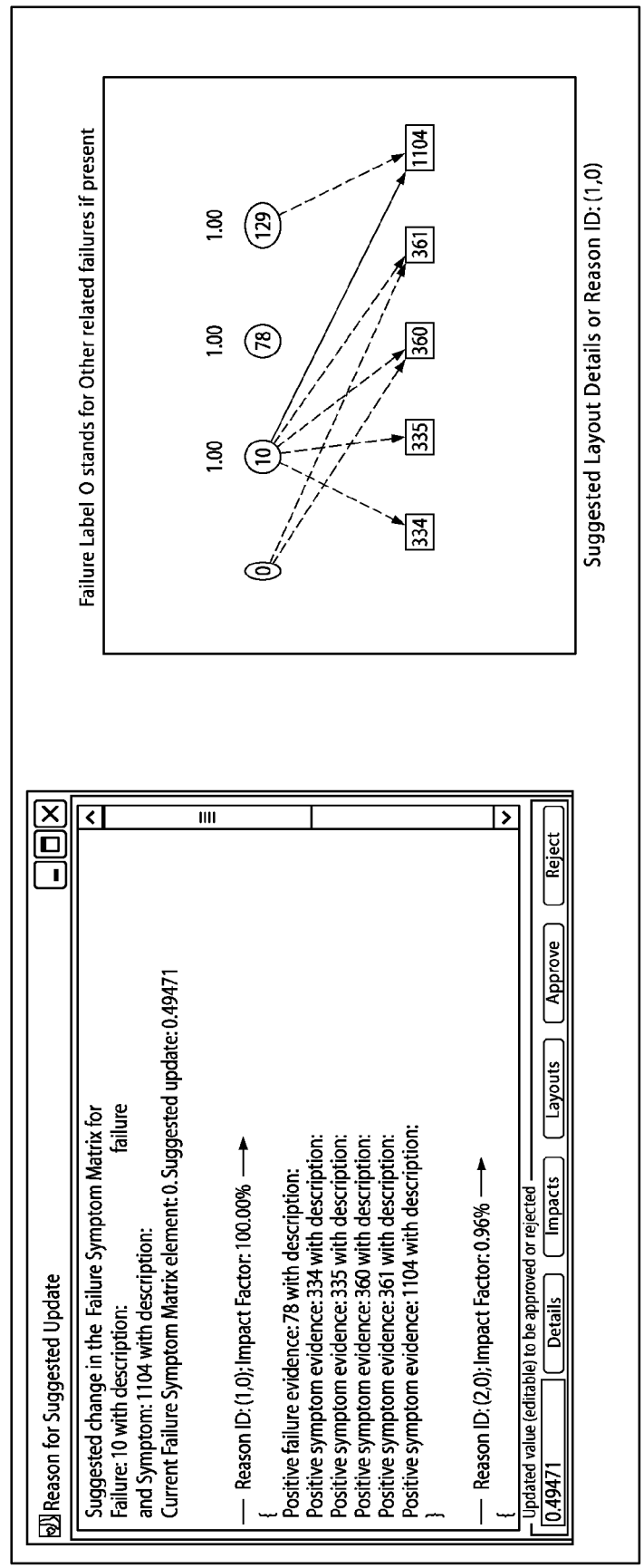

The examples above have shown missing links in the original system model being detected by the update assistance application and new links being proposed. There can be circumstances where the links are missing but also hidden. These cannot be easily visualized just by using the failure case data and an example screen display for dealing with such a situation is shown in FIG. 13. In that example it can be observed that Failure 78, and Symptoms 334, 335, 360, 361 and 1104 are present in the Failure Case. Symptoms 334 and 335 are related only to the Failure 10. Thus, although Failure 10 is not observed in this particular Failure Case, the presence of Symptoms 334 and 335 creates strong evidence for the presence of Failure 10. As the probability of the Failure 10 being present is high, the missing hidden link in between the Failure 10 and Symptom 1104 is created as a result of the learning and the situation is displayed to the user with the reasons.

Figure 14:
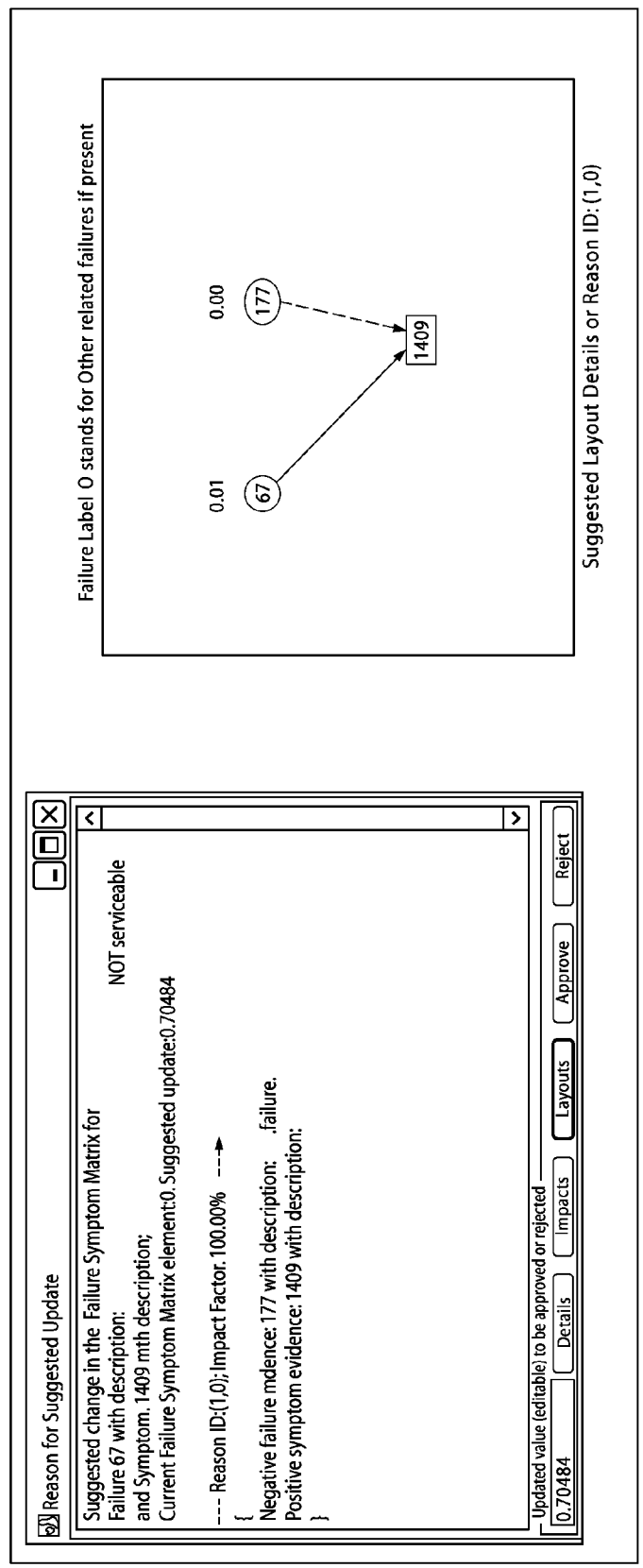

The above examples have presented present failure cases, but absent failures may also arise. FIG. 14 shows an example screen display that may be presented when a absent failure occurs in a Failure Case. In this example it can be observed that Failure 177 is absent, and Symptom 1409 is present in the Failure Case. Symptom 1409 is related only to the Failure 177. Since Failure 177 is absent, the links in between the Symptom 1409 and all other failures except the Failure 177 are created as a result of learning and suggested to the SME with reasons. One of them is the link in between Failure 67 and Symptom 1409, which is presented in the layout example of FIG. 10 above.

The embodiments described above can produce highly accurate updated system models. They can also generate suggestions for updating system model parameters and detail the most probable reasons for making those suggestions. The embodiments can help users update system model parameters and can also assist users with more easily detecting incorrect data entries in large failure case/evidence data sets.

The invention claimed is:

1. A method of assisting with updating a model for diagnosing failures in a system, the method including:
   obtaining system model data representing a set of failures in a system including a plurality of components, a set of symptoms and relationships between at least some of the failures and symptoms;
   creating a Bayesian Network having parameters based on the obtained system model data, the Bayesian Network describing probabilistic relationships between at least some of the failures and at least some of the symptoms;
   obtaining failure cases data representing a plurality of failure cases, each said failure case describing presence/absence of at least one of the symptoms and presence/absence of at least one of the failures;
   performing a learning operation on the Bayesian Network using the failure cases data;
   assessing a contribution made by at least some of the failure cases to an updating of the parameters of the Bayesian Network during the learning operation by obtaining a three dimensional gradient analysis object based on a likelihood gradient contribution of the failure cases; and
   displaying information representing the assessed contribution of the at least some failure cases.

2. A method according to claim 1, wherein the relationships between at least some of the failures and symptoms in the system model data includes failure-symptom conditional probabilities.

3. A method according to claim 1, wherein the gradient contribution is calculated for each of the at least some failure cases for each of the Bayesian Network parameters and for each optimisation epoch of the learning operation.

4. A method according to claim 1, further including receiving an input representing a selection of one of the updated parameters and wherein the displayed information includes at least one said failure case associated with the selected parameter, the at least one displayed failure case being selected according to its assessed contribution to the updating of the selected parameter.

5. A method according to claim 4, further including receiving an input indicating acceptance or rejection of the updated selected parameter, and when the input indicates acceptance, updating data corresponding to the updated selected parameter in the system model data.

6. A method according to claim 5, wherein the system model data is updated with a new value for a conditional probability between a said failure and a said symptom as calculated by the learning operation.

7. A method according to claim 5, wherein the system model data is updated with a new value for a failure prior probability or a symptom-leak probability as calculated by the learning operation.

8. A method according to claim 1, wherein the displayed information includes a proposal for increasing/decreasing a conditional probability between a said failure and a said symptom based on parameters updated by the learning operation.

9. A method according to claim 1, wherein the displayed information includes a proposal for removing/adding a conditional probability relationship/link between a said failure and a said symptom based on parameters updated by the learning operation.

10. A method according to claim 1, wherein the calculation of the likelihood gradient contribution includes:
    using the three-dimensional gradient analysis object to generate a two-dimensional gradient analysis table;
    sorting a column of the generated table including a selected parameter according to the gradient contribution of the failure cases in that column;
    selecting at least one failure case in the sorted column having a highest said gradient contribution(s); and
    normalising the at least one selected failure case.

11. A method according to claim 1, wherein the Bayesian Network comprises a Binary Node Two-layer Noisy-Or Bayesian Network.

12. A method according to claim 11, wherein the learning operation includes a maximal likelihood learning operation.

13. A computer program product comprising an non-transitory computer readable medium, having thereon computer program code means, when the program code is loaded, to make a computer execute a method of assisting with updating a model for diagnosing failures in a system, the method including:
    obtaining system model data representing a set of failures in a system including a plurality of components, a set of symptoms and relationships between at least some of the failures and symptoms;
    creating a Bayesian Network having parameters based on the obtained system model data, the Bayesian Network describing probabilistic relationships between at least some of the failures and at least some of the symptoms;
    obtaining failure cases data representing a plurality of failure cases, each said failure case describing presence/absence of at least one of the symptoms and presence/absence of at least one of the failures;
    performing a learning operation on the Bayesian Network using the failure cases data;
    assessing a contribution made by at least some of the failure cases to an updating of the parameters of the Bayesian Network during the learning operation by obtaining a three dimensional gradient analysis object based on a likelihood gradient contribution of the failure cases; and
    displaying information representing the assessed contribution of the at least some failure cases.

14. An apparatus for assisting with updating a model for diagnosing failures in a system, the apparatus including:
    a computing device for obtaining system model data representing a set of failures in a system including a plurality of components, a set of symptoms and relationships between at least some of the failures and symptoms;
    a computing device for creating a Bayesian Network having parameters based on the obtained system model data, the Bayesian Network describing probabilistic relationships between at least some of the failures and at least some of the symptoms;

a computing device for obtaining failure cases data representing a plurality of failure cases, each said failure case describing presence/absence of at least one of the symptoms and presence/absence of at least one of the failures;

a computing device for performing a learning operation on the Bayesian Network using the failure cases data;

a computing device for assessing a contribution made by at least some of the failure cases to an updating of the parameters of the Bayesian Network during the learning operation by obtaining a three dimensional gradient analysis object based on a likelihood gradient contribution of the failure cases; and a device for displaying information representing the assessed contribution of the at least some failure cases.

* * * * *